United States Patent
Sehgal (10) Patent No.: US 11,943,374 B2
(45) Date of Patent: *Mar. 26, 2024

(54) SYSTEM, METHOD, AND COMPUTER PROGRAM PRODUCT FOR DETECTING MALICIOUS CHANGELOG MODIFICATIONS WITH BLOCKCHAIN

(71) Applicant: Visa International Service Association, San Francisco, CA (US)

(72) Inventor: Rohit Sehgal, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,259

(22) Filed: Jul. 5, 2022

(65) Prior Publication Data
US 2022/0337433 A1    Oct. 20, 2022

Related U.S. Application Data

(63) Continuation of application No. 16/801,683, filed on Feb. 26, 2020, now Pat. No. 11,411,745.

(51) Int. Cl.
*H04L 29/06* (2006.01)
*G06F 16/23* (2019.01)
*H04L 9/06* (2006.01)
*H04L 9/32* (2006.01)
*H04L 9/00* (2022.01)

(52) U.S. Cl.
CPC ........ *H04L 9/3263* (2013.01); *G06F 16/2365* (2019.01); *G06F 16/2379* (2019.01); *H04L 9/0637* (2013.01); *H04L 9/50* (2022.05)

(58) Field of Classification Search
CPC . H04L 9/3263; H04L 9/0637; H04L 2209/38; H04L 9/0891; H04L 9/3239; G06F 16/2365; G06F 16/2379
See application file for complete search history.

(56) References Cited

U.S. PATENT DOCUMENTS 10,621,164 B1    4/2020   Kain
2018/0227119 A1*  8/2018   Bibera .................. H04L 9/3239
(Continued)

FOREIGN PATENT DOCUMENTS

CN    105404701 A    3/2016
CN    109241181 A    1/2019

*Primary Examiner* — Mahfuzur Rahman
(74) *Attorney, Agent, or Firm* — The Webb Law Firm (57) ABSTRACT

Described are a system, method, and computer program product for detecting malicious changelog modifications with blockchain. The method includes identifying at least one database transaction that was initiated in response to a request by a user and receiving a first changelog record associated with the at least one database transaction from a target blockchain of at least one changelog blockchain. The method also includes determining a public key associated with the user and attempting a decryption of the first changelog record using the public key. The method further includes detecting tampering of the target blockchain for the at least one database transaction based on determining that the decryption of the first changelog record has failed, and restoring at least part of the target blockchain with at least part of a verified changelog blockchain based on the tampering of the target blockchain.

20 Claims, 5 Drawing Sheets

(56) References Cited

U.S. PATENT DOCUMENTS

| | | |
|---|---|---|
| 2018/0285839 A1 | 10/2018 | Yang et al. |
| 2019/0156923 A1* | 5/2019 | Kain ..................... G06F 16/958 |
| 2019/0304578 A1* | 10/2019 | Kain ................... G06F 16/2379 |
| 2020/0050782 A1 | 2/2020 | Song et al. |
| 2020/0082112 A1 | 3/2020 | Altshuler et al. |
| 2020/0126321 A1 | 4/2020 | Swearingen |
| 2020/0272619 A1 | 8/2020 | Alferov |
| 2022/0123942 A1* | 4/2022 | Geissler .............. H04L 63/0442 |

* cited by examiner

SYSTEM, METHOD, AND COMPUTER PROGRAM PRODUCT FOR DETECTING MALICIOUS CHANGELOG MODIFICATIONS WITH BLOCKCHAIN

CROSS-REFERENCE TO RELATED APPLICATION

This application is a continuation of U.S. application Ser. No. 16/801,683, filed Feb. 26, 2020, the disclosure of which is hereby incorporated in its entirety by reference.

BACKGROUND

1. Technical Field

Disclosed embodiments or aspects relate generally to database security, and, in one particular embodiment or aspect, to a system, method, and computer program product for detecting and preventing malicious database changes using blockchain changelogs.

2. Technical Considerations

Database systems are an important aspect of most organizations and are often associated with computer network applications. Given the increase in dependence on databases, it is important to implement database security effectively. Databases may be configured behind firewalls and have access controls to restrict user access. Such security protocols essentially restrict user access to a group of authorized users, e.g., database administrators. However, for a trusted user who has security credentials that permit access to a database, the trusted user may make edits to the database. Moreover, if the trusted user acts maliciously, the trusted user may alter changelogs associated with the database to mask, remove, or change the nature of edits that have been made to the database.

Therefore, there is a need in the art for an improved system and method for detecting malicious changelog modifications, particularly to maintain a secured database changelog record and detect when changelog records have been manipulated.

SUMMARY

Accordingly, and generally, provided is an improved system, method, and computer program product for detecting malicious changelog modifications with blockchain. Preferably, provided is a system, method, and computer program product for receiving, from a computing device of a user, a request for a database transaction. Preferably, provided is a system, method, and computer program product for determining transaction-operative data associated with the database transaction and a user identifier. Preferably, provided is a system, method, and computer program product for generating an encrypted transaction record including the transaction-operative data and the user identifier. Preferably, provided is a system, method, and computer program product for broadcasting the encrypted transaction record to a changelog blockchain and, in response to receiving a confirmation of publication as a changelog record, initiating the database transaction. Preferably, provided is a system, method, and computer program product for receiving a verification request and the changelog record from a target blockchain. Preferably, provided is a system, method, and computer program product for determining a public key associated with the user, attempting to decrypt the changelog record using the public key and, based on the result, detecting tampering or verifying the target blockchain.

According to non-limiting embodiments or aspects, provided is a method for detecting malicious changelog modifications with blockchain. The method includes receiving, with at least one processor from a computing device of a user, at least one request for at least one database transaction. The method further includes determining, with at least one processor, transaction-operative data associated with the at least one database transaction and a user identifier associated with the user. The method further includes generating, with at least one processor using a private key of the user, an encrypted transaction record including an encryption of the transaction-operative data and the user identifier. The method further includes broadcasting, with at least one processor, the encrypted transaction record to at least one changelog blockchain. The method further includes, in response to receiving at least one confirmation of the encrypted transaction record being published as a changelog record to the at least one changelog blockchain, initiating the at least one database transaction. The method further includes receiving, with at least one processor, a verification request identifying the at least one database transaction and a target blockchain of the at least one changelog blockchain. The method further includes receiving, with at least one processor, a first changelog record associated with the at least one database transaction from the target blockchain. The method further includes determining, with at least one processor from a public key infrastructure (PKI), a public key associated with the user. The method further includes attempting, with at least one processor, to decrypt the first changelog record using the public key. The method further includes: (i) in response to failed decryption of the first changelog record using the public key, detecting tampering of the target blockchain for the at least one database transaction; or (ii) in response to successful decryption of the first changelog record using the public key, verifying the target blockchain for the at least one database transaction.

In some non-limiting embodiments or aspects, initiating the at least one database transaction may include storing, in at least one database, a blockchain pointer to the encrypted transaction record in association with transaction data of the at least one database transaction. The method may include identifying the first changelog record from the verification request based on the blockchain pointer stored in association with transaction data of the at least one database transaction.

In some non-limiting embodiments or aspects, the method may include, in response to failed decryption of the first changelog record using the public key, receiving, with at least one processor, a second changelog record associated with the at least one database transaction from a separate blockchain of the at least one changelog blockchain, and attempting, with at least one processor, to decrypt the second changelog record using the public key.

In some non-limiting embodiments or aspects, the method may include, in response to failed decryption of the second changelog record using the public key, detecting tampering of the separate blockchain for the at least one database transaction. The method may also include, in response to successful decryption of the second changelog record using the public key, restoring the first changelog record of the target blockchain using the second changelog record of the separate blockchain.

In some non-limiting embodiments or aspects, the at least one database transaction may include a plurality of database transactions. The verification request may be associated with an automatically triggered internal review of a database system. The verification request may be further configured to cause at least one processor to attempt to decrypt each changelog record of the target blockchain associated with each of the at least one database transaction.

According to non-limiting embodiments or aspects, provided is a system for detecting malicious changelog modifications with blockchain. The system includes a server including at least one processor, the server being programmed and/or configured to receive, from a computing device of a user, at least one request for at least one database transaction. The server is programmed and/or configured to determine transaction-operative data associated with the at least one database transaction and a user identifier associated with the user. The server is programmed and/or configured to generate, using a private key of the user, an encrypted transaction record including an encryption of the transaction-operative data and the user identifier. The server is programmed and/or configured to broadcast the encrypted transaction record to at least one changelog blockchain. The server is programmed and/or configured to, in response to receiving at least one confirmation of the encrypted transaction record being published as a changelog record to the at least one changelog blockchain, initiate the at least one database transaction. The server is programmed and/or configured to receive a verification request identifying the at least one database transaction and a target blockchain of the at least one changelog blockchain. The server is programmed and/or configured to receive a first changelog record associated with the at least one database transaction from the target blockchain. The server is programmed and/or configured to determine, from a public key infrastructure (PKI), a public key associated with the user. The server is programmed and/or configured to attempt to decrypt the first changelog record using the public key. The server is programmed and/or configured to: (i) in response to failed decryption of the first changelog record using the public key, detect tampering of the target blockchain for the at least one database transaction; or (ii) in response to successful decryption of the first changelog record using the public key, verify the target blockchain for the at least one database transaction.

In some non-limiting embodiments or aspects, initiating the at least one database transaction may include storing, in at least one database, a blockchain pointer to the encrypted transaction record in association with transaction data of the at least one database transaction. The server is further programmed and/or configured to identify the first changelog record from the verification request based on the blockchain pointer stored in association with transaction data of the at least one database transaction.

In some non-limiting embodiments or aspects, the server may be further programmed and/or configured to, in response to failed decryption of the first changelog record using the public key, receive a second changelog record associated with the at least one database transaction from a separate blockchain of the at least one changelog blockchain, and attempt to decrypt the second changelog record using the public key.

In some non-limiting embodiments or aspects, the server may be further programmed and/or configured to, in response to failed decryption of the second changelog record using the public key, detect tampering of the separate blockchain for the at least one database transaction. The server may be further programmed and/or configured to, in response to successful decryption of the second changelog record using the public key, restore the first changelog record of the target blockchain using the second changelog record of the separate blockchain.

In some non-limiting embodiments or aspects, the at least one database transaction may include a plurality of database transactions. The verification request may be associated with an automatically triggered internal review of a database system. The verification request may be configured to cause the server to attempt to decrypt each changelog record of the target blockchain associated with each of the at least one database transaction.

According to non-limiting embodiments or aspects, provided is a computer program product for detecting malicious changelog modifications with blockchain. The computer program product includes at least one non-transitory computer-readable medium including program instructions that, when executed by at least one processor, cause the at least one processor to receive, from a computing device of a user, at least one request for at least one database transaction. The program instructions further cause the at least one processor to determine transaction-operative data associated with the at least one database transaction and a user identifier associated with the user. The program instructions further cause the at least one processor to generate, using a private key of the user, an encrypted transaction record including an encryption of the transaction-operative data and the user identifier. The program instructions further cause the at least one processor to broadcast the encrypted transaction record to at least one changelog blockchain. The program instructions further cause the at least one processor to, in response to receiving at least one confirmation of the encrypted transaction record being published as a changelog record to the at least one changelog blockchain, initiate the at least one database transaction. The program instructions further cause the at least one processor to receive a verification request identifying the at least one database transaction and a target blockchain of the at least one changelog blockchain. The program instructions further cause the at least one processor to receive a first changelog record associated with the at least one database transaction from the target blockchain. The program instructions further cause the at least one processor to determine, from a public key infrastructure (PKI), a public key associated with the user. The program instructions further cause the at least one processor to attempt to decrypt the first changelog record using the public key. The program instructions further cause the at least one processor to: (i) in response to failed decryption of the first changelog record using the public key, detect tampering of the target blockchain for the at least one database transaction; or (ii) in response to successful decryption of the first changelog record using the public key, verify the target blockchain for the at least one database transaction.

In some non-limiting embodiments or aspects, initiating the at least one database transaction may include storing, in at least one database, a blockchain pointer to the encrypted transaction record in association with transaction data of the at least one database transaction. The program instructions may further cause the at least one processor to identify the first changelog record from the verification request based on the blockchain pointer stored in association with transaction data of the at least one database transaction.

In some non-limiting embodiments or aspects, the program instructions may further cause the at least one processor to, in response to failed decryption of the first changelog record using the public key, receive a second changelog record associated with the at least one database transaction from a separate blockchain of the at least one changelog blockchain, and attempt to decrypt the second changelog record using the public key.

In some non-limiting embodiments or aspects, the program instructions may further cause the at least one processor to: in response to failed decryption of the second changelog record using the public key, detect tampering of the separate blockchain for the at least one database transaction; or, in response to successful decryption of the second changelog record using the public key, restore the first changelog record of the target blockchain using the second changelog record of the separate blockchain.

In some non-limiting embodiments or aspects, the at least one database transaction may include a plurality of database transactions. The verification request is associated with an automatically triggered internal review of a database system, the verification request further configured to cause the at least one processor to attempt to decrypt each changelog record of the target blockchain associated with each of the at least one database transaction.

Other non-limiting embodiments or aspects of the present disclosure will be set forth in the following numbered clauses:

Clause 1: A computer-implemented method comprising: receiving, with at least one processor from a computing device of a user, at least one request for at least one database transaction; determining, with at least one processor, transaction-operative data associated with the at least one database transaction and a user identifier associated with the user; generating, with at least one processor using a private key of the user, an encrypted transaction record comprising an encryption of the transaction-operative data and the user identifier; broadcasting, with at least one processor, the encrypted transaction record to at least one changelog blockchain; in response to receiving at least one confirmation of the encrypted transaction record being published as a changelog record to the at least one changelog blockchain, initiating the at least one database transaction; receiving, with at least one processor, a verification request identifying the at least one database transaction and a target blockchain of the at least one changelog blockchain; receiving, with at least one processor, a first changelog record associated with the at least one database transaction from the target blockchain; determining, with at least one processor from a public key infrastructure (PKI), a public key associated with the user; attempting, with at least one processor, to decrypt the first changelog record using the public key; and (i) in response to failed decryption of the first changelog record using the public key, detecting tampering of the target blockchain for the at least one database transaction; or (ii) in response to successful decryption of the first changelog record using the public key, verifying the target blockchain for the at least one database transaction.

Clause 2: The computer-implemented method of clause 1, wherein initiating the at least one database transaction comprises storing, in at least one database, a blockchain pointer to the encrypted transaction record in association with transaction data of the at least one database transaction.

Clause 3: The computer-implemented method of clause 1 or clause 2, further comprising identifying the first changelog record from the verification request based on the blockchain pointer stored in association with transaction data of the at least one database transaction.

Clause 4: The computer-implemented method of any of clauses 1-3, further comprising, in response to failed decryption of the first changelog record using the public key: receiving, with at least one processor, a second changelog record associated with the at least one database transaction from a separate blockchain of the at least one changelog blockchain; and attempting, with at least one processor, to decrypt the second changelog record using the public key.

Clause 5: The computer-implemented method of any of clauses 1-4, further comprising, in response to failed decryption of the second changelog record using the public key, detecting tampering of the separate blockchain for the at least one database transaction.

Clause 6: The computer-implemented method of any of clauses 1-5, further comprising, in response to successful decryption of the second changelog record using the public key, restoring the first changelog record of the target blockchain using the second changelog record of the separate blockchain.

Clause 7: The computer-implemented method of any of clauses 1-6, wherein the at least one database transaction comprises a plurality of database transactions, and wherein the verification request is associated with an automatically triggered internal review of a database system, the verification request further configured to cause at least one processor to attempt to decrypt each changelog record of the target blockchain associated with each of the at least one database transaction.

Clause 8: A system comprising a server comprising at least one processor, the server being programmed and/or configured to: receive, from a computing device of a user, at least one request for at least one database transaction; determine transaction-operative data associated with the at least one database transaction and a user identifier associated with the user; generate, using a private key of the user, an encrypted transaction record comprising an encryption of the transaction-operative data and the user identifier; broadcast the encrypted transaction record to at least one changelog blockchain; in response to receiving at least one confirmation of the encrypted transaction record being published as a changelog record to the at least one changelog blockchain, initiate the at least one database transaction; receive a verification request identifying the at least one database transaction and a target blockchain of the at least one changelog blockchain; receive a first changelog record associated with the at least one database transaction from the target blockchain; determine, from a public key infrastructure (PKI), a public key associated with the user; attempt to decrypt the first changelog record using the public key; and (i) in response to failed decryption of the first changelog record using the public key, detect tampering of the target blockchain for the at least one database transaction; or (ii) in response to successful decryption of the first changelog record using the public key, verify the target blockchain for the at least one database transaction.

Clause 9: The system of clause 8, wherein initiating the at least one database transaction comprises storing, in at least one database, a blockchain pointer to the encrypted transaction record in association with transaction data of the at least one database transaction.

Clause 10: The system of clause 8 or clause 9, wherein the server is further programmed and/or configured to identify the first changelog record from the verification request based on the blockchain pointer stored in association with transaction data of the at least one database transaction.

Clause 11: The system of any of clauses 8-10, wherein the server is further programmed and/or configured to, in response to failed decryption of the first changelog record using the public key: receive a second changelog record associated with the at least one database transaction from a separate blockchain of the at least one changelog blockchain; and attempt to decrypt the second changelog record using the public key.

Clause 12: The system of any of clauses 8-11, wherein the server is further programmed and/or configured to, in response to failed decryption of the second changelog record using the public key, detect tampering of the separate blockchain for the at least one database transaction.

Clause 13: The system of any of clauses 8-12, wherein the server is further programmed and/or configured to, in response to successful decryption of the second changelog record using the public key, restore the first changelog record of the target blockchain using the second changelog record of the separate blockchain.

Clause 14: The system of any of clauses 8-13, wherein the at least one database transaction comprises a plurality of database transactions, and wherein the verification request is associated with an automatically triggered internal review of a database system, the verification request further configured to cause the server to attempt to decrypt each changelog record of the target blockchain associated with each of the at least one database transaction.

Clause 15: A computer program product comprising at least one non-transitory computer-readable medium including program instructions that, when executed by at least one processor, cause the at least one processor to: receive, from a computing device of a user, at least one request for at least one database transaction; determine transaction-operative data associated with the at least one database transaction and a user identifier associated with the user; generate, using a private key of the user, an encrypted transaction record comprising an encryption of the transaction-operative data and the user identifier; broadcast the encrypted transaction record to at least one changelog blockchain; in response to receiving at least one confirmation of the encrypted transaction record being published as a changelog record to the at least one changelog blockchain, initiate the at least one database transaction; receive a verification request identifying the at least one database transaction and a target blockchain of the at least one changelog blockchain; receive a first changelog record associated with the at least one database transaction from the target blockchain; determine, from a public key infrastructure (PKI), a public key associated with the user; attempt to decrypt the first changelog record using the public key; and (i) in response to failed decryption of the first changelog record using the public key, detect tampering of the target blockchain for the at least one database transaction; or (ii) in response to successful decryption of the first changelog record using the public key, verify the target blockchain for the at least one database transaction.

Clause 16: The computer program product of clause 15, wherein initiating the at least one database transaction comprises storing, in at least one database, a blockchain pointer to the encrypted transaction record in association with transaction data of the at least one database transaction.

Clause 17: The computer program product of clause 15 or clause 16, wherein the program instructions further cause the at least one processor to identify the first changelog record from the verification request based on the blockchain pointer stored in association with transaction data of the at least one database transaction.

Clause 18: The computer program product of any of clauses 15-17, wherein the program instructions further cause the at least one processor to, in response to failed decryption of the first changelog record using the public key: receive a second changelog record associated with the at least one database transaction from a separate blockchain of the at least one changelog blockchain; and attempt to decrypt the second changelog record using the public key.

Clause 19: The computer program product of any of clauses 15-18, wherein the program instructions further cause the at least one processor to: in response to failed decryption of the second changelog record using the public key, detect tampering of the separate blockchain for the at least one database transaction; or, in response to successful decryption of the second changelog record using the public key, restore the first changelog record of the target blockchain using the second changelog record of the separate blockchain.

Clause 20: The computer program product of any of clauses 15-19, wherein the at least one database transaction comprises a plurality of database transactions, and wherein the verification request is associated with an automatically triggered internal review of a database system, the verification request further configured to cause the at least one processor to attempt to decrypt each changelog record of the target blockchain associated with each of the at least one database transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a system, method, and computer program product for detecting malicious changelog modifications. Described embodiments and aspects improve upon prior art technical solutions by generating and maintain a more secure database changelog. The described database changelog is executed across changelog blockchains, such that all computing devices retaining a blockchain maintain an independent database changelog. By encrypting transaction records of database transactions in a distributed blockchain, malicious changes to a changelog will corrupt the encryption, such that a corresponding public key will no longer decrypt the tampered changelog record. Because the changelog is distributed, the changelog can be restored or cross-checked across multiple changelog blockchains. As such, database network security is greatly improved. Moreover, fewer computer resources (e.g., processing power, memory storage, bandwidth, etc.) need to be expended in the described systems and methods, by reducing reliance on database backups, which may have been employed as a fallback in the case of malicious interference. Furthermore, the described systems and methods may replace systems requiring more than one user to initiate a database transaction (e.g., request-and-signoff systems), thereby reducing number of network communications and time from transaction request to transaction execution.

Non-limiting embodiments or aspects of the present disclosure utilize multi-chain, which is built on blockchain technology. The described systems and methods use blockchain protocol to preserve database states.

Figure 1:
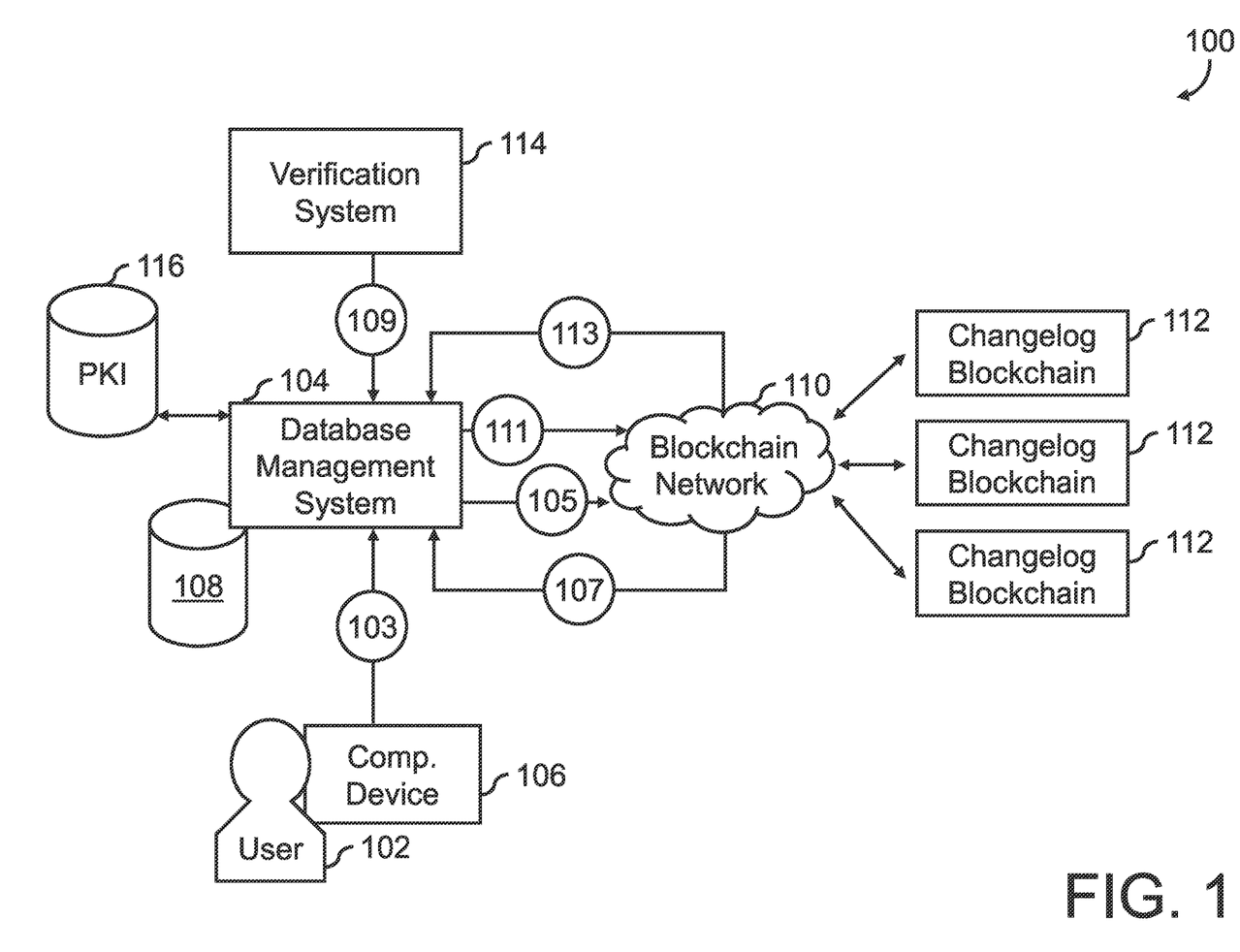
FIG. 1 is a diagram of a non-limiting embodiment of an environment in which systems, apparatuses, and/or methods, as described herein, may be implemented.

Referring now to FIG. 1, illustrated is a diagram of an example environment 100 in which devices, systems, and/or methods, described herein, may be implemented. As shown in FIG. 1, environment 100 includes a database management system 104 associated with a database 108. The database management system 104 may be communicatively connected to a blockchain network 110 (e.g., a set of one or more changelog blockchains 112 configured to communicate with the database management system 104 and store changelog records). The database management system 104 may be programmed and/or configured to receive requests for database transactions, validate/authenticate the requests, modify the database according to the requests, create changelog records of database transactions, and/or validate the integrity of the changelog records. The database management system 104 may be communicatively connected to and manage one or more databases 108. The database management system 104 may receive, from a computing device 106 of a user 102, one or more requests 103 for one or more database transactions. The database management system 104 may determine, based at least partly on the request 103, transaction-operative data associated with the one or more database transactions. Transaction-operative data may be information of one or more modifications to one or more records of one or more databases 108. A modification to a database record may include, but is not limited to, an edit, insertion, and/or deletion of one or more cells, rows, columns, relations, and/or tables. The database management system 104 may also determine a user identifier associated with the user 102. The user identifier may be representative of, but is not limited to, a network account identifier, a computing device identifier, a network session identifier, and/or the like.

The database management system 104 and/or user computing device 106 may generate, using a private key of the user, an encrypted transaction record including an encryption of the transaction-operative data and/or user identifier. The database management system 104 may broadcast the encrypted transaction record in a publication request 105 to one or more changelog blockchains 112, wherein an encrypted transaction record written to a changelog blockchain 112 acts as a changelog record. If the encrypted transaction record is successfully published to a changelog blockchain 112, the database management system 104 may receive a confirmation 107 of publication from one or more changelog blockchains 112. A confirmation 107 may include, but is not limited to, a success/failure status, one or more blockchain pointers (e.g., a location reference to one or more changelog records), one or more identifiers of changelog blockchains 112, or any combination thereof. In response to receive one or more confirmations 107, the database management system 104 may initiate one or more database transactions corresponding to the published encrypted transaction records. In doing so, the database management system 104 may store, in one or more modified records of a database 108, a blockchain pointer to an encrypted transaction record stored as a changelog record that is associated with a database transaction that created the record modification.

The environment 100 may further include a verification system 114, which may be programmed and/or configured to trigger review of one or more changelog records of one or more changelog blockchains 112. The verification system 114 may be included in a database management system 104. The database management system 104 or verification system 114 may internally or externally receive a verification request 109 from a computing device 106, the verification system 114, and/or the database management system 104. The verification request 109 may identify a database transaction, changelog record, and/or a target changelog blockchain 112 to review to detect record tampering, if any. The database management system 104 and/or verification system 114 may initiate a communication 111 with one or more changelog blockchains 112 to retrieve one or more changelog records including one or more encrypted transaction records. The database management system 104 and/or verification system 114 may receive one or more changelog records (e.g., a first changelog record) associated with a database transaction of the target blockchain 112. If a changelog record does not exist in a changelog blockchain 112 for a given database transaction, it may be concluded that the changelog record was deleted (e.g., due to malicious tampering) from a changelog blockchain 112. If a changelog record does exist, however, it may be tested for tampering of the record itself.

The verification system 114 and/or database management system 104 may communicate with a public key infrastructure (PKI) 116 to determine a public key associated with the user. The PKI 116 may be programmed and/or configured to store one or more public keys associated with network accounts of users 102 in the environment 100, the public keys corresponding to private keys used to generate encrypted transaction records. Public keys may be retrieved from a PKI 116 using user identifiers (e.g., employee ID, network account ID, etc.) or other unique identifiers. The verification system 114 and/or database management system 104 may attempt to decrypt one or more encrypted transaction records of one or more received changelog records using public keys corresponding to the private keys used to create the encrypted transaction records. In response to failed decryption of a changelog record, the verification system 114 and/or database management system 104 may detect tampering of a target blockchain (e.g., with respect to the changelog record) from which the failed-decryption changelog record was retrieved. Failed decryption may indicate that a changelog record has been altered in some way, which would cause the public key to no longer be a viable decryption key. In response to successful decryption of a changelog record, it may be concluded that the changelog record has not been altered, and a verification system 114 and/or database management system 104 may therefore verify that the target blockchain has not been tampered, with respect to the tested changelog record and corresponding database transaction.

For a verification request 109 that identifies at least one database transaction, the database management system 104 may identify a changelog record of a changelog blockchain 112 from a blockchain pointer stored in the database 108 with a database record. Further, in response to failed decryption of a changelog record using a public key, the verification system 114 and/or database management system 104 may receive another changelog record (e.g., second changelog record) associated with a same database transaction from a separate blockchain 112 (e.g., different from the first target blockchain). The verification system 114 and/or database management system 104 may attempt to decrypt the one or more changelog records from the separate blockchain 112 using corresponding public keys of the user 102 that initiated database transactions associated with the changelog records. In response to failed decryption of the one or more changelog records from the separate blockchain 112, the verification system 114 and/or database management system 104 may detect tampering of the separate blockchain 112 for database transactions associated with the one or more tested changelog records. In response to successful decryption of the one or more changelog records from the separate blockchain 112, the verification system 114 and/or database management system 104 may restore a first changelog record of the first-tested blockchain 112 (e.g., target blockchain) using a second changelog record of the second-tested blockchain 112 (e.g., separate blockchain). Restoration may include overwriting part or all of a tampered changelog blockchain 112 with part or all of a verified changelog blockchain 112.

The above-described systems and methods may be used for a plurality of database transactions. The verification request 109 may be associated with an automatically triggered internal review of a database system including one or more databases 108 and one or more changelog blockchains 112. The verification request 109 may be configured to cause the verification system 114 and/or database management system 104 to receive and attempt to decrypt each changelog record of a target blockchain for each of the plurality of database transactions.

Figure 2:
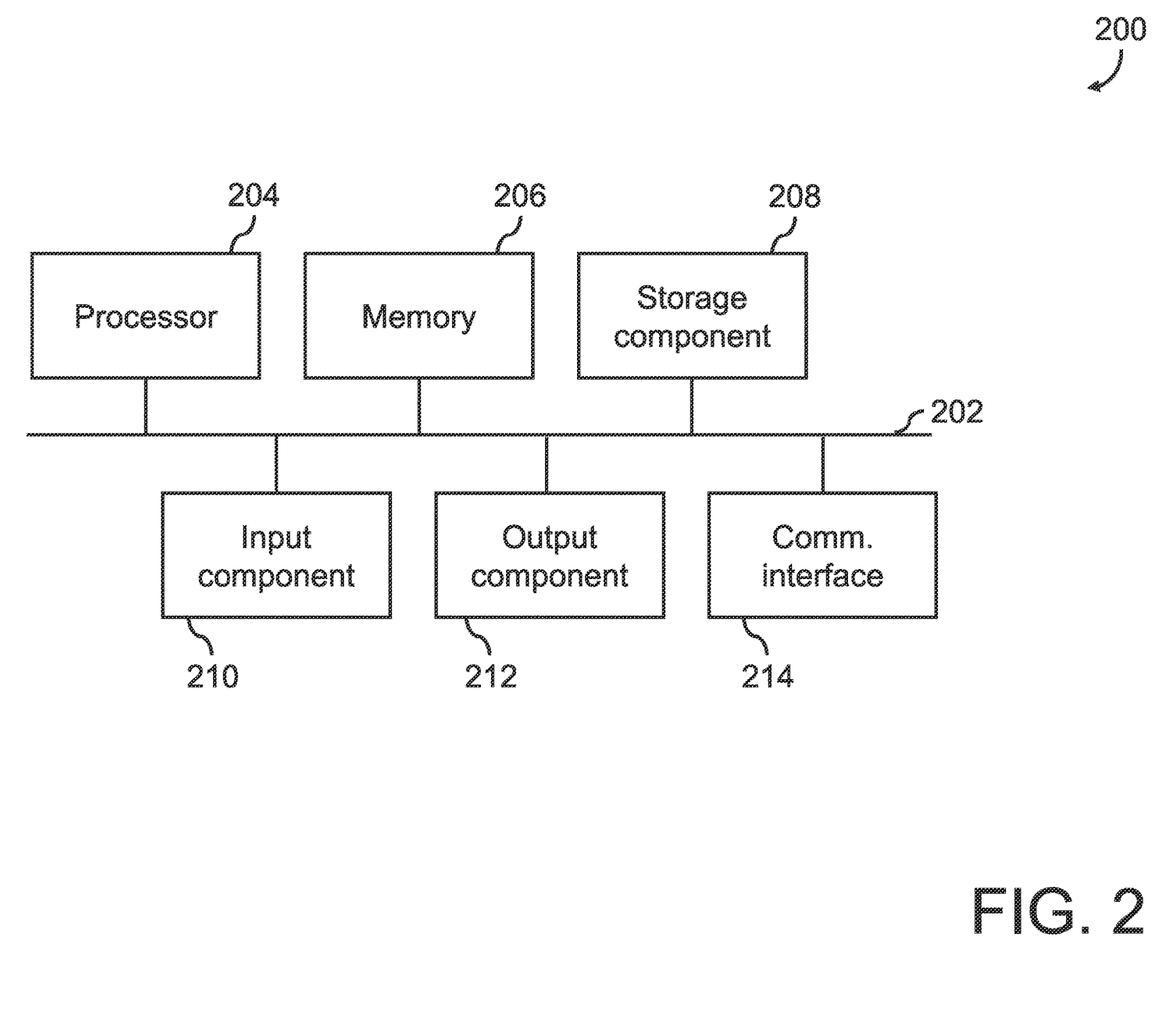
FIG. 2 is a diagram of a non-limiting embodiment of components of one or more devices of FIG. 1.

With specific reference to FIG. 2, and in some non-limiting embodiments or aspects, illustrated is a diagram of example components of computing device 200. Computing device 200 may correspond to one or more devices of user computing device 106, database management system 104, verification system 114, and/or changelog blockchain 112. In some non-limiting embodiments or aspects, one or more devices of the foregoing may include at least one computing device 200 and/or at least one component of computing device 200. As shown in FIG. 2, computing device 200 may include bus 202, processor 204, memory 206, storage component 208, input component 210, output component 212, and communication interface 214.

Bus 202 may include a component that permits communication among the components of computing device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits computing device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from computing device 200 (e.g., a display, a speaker, one or more light-emitting diodes (LEDs), etc.).

Communication interface 214 may include a transceiver-like component (e.g., a transceiver, a separate receiver and transmitter, etc.) that enables computing device 200 to communicate with other devices, such as via a wired connection, a wireless connection, or a combination of wired and wireless connections. Communication interface 214 may permit computing device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Computing device 200 may perform one or more processes described herein. Computing device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Computing device 200 may be capable of receiving information from, storing information in, communicating information to, or searching information stored in the data storage or one or more data structures in memory 206 and/or storage component 208. For example, the information may include encryption data, input data, output data, transaction data, transaction account data, or any combination thereof.

The number and arrangement of components shown in FIG. 2 are provided as an example. In some non-limiting embodiments or aspects, computing device 200 may include additional components, fewer components, different components, or differently arranged components than those shown in FIG. 2. Additionally or alternatively, a set of components (e.g., one or more components) of computing device 200 may perform one or more functions described as being performed by another set of components of computing device 200.

Figure 3:
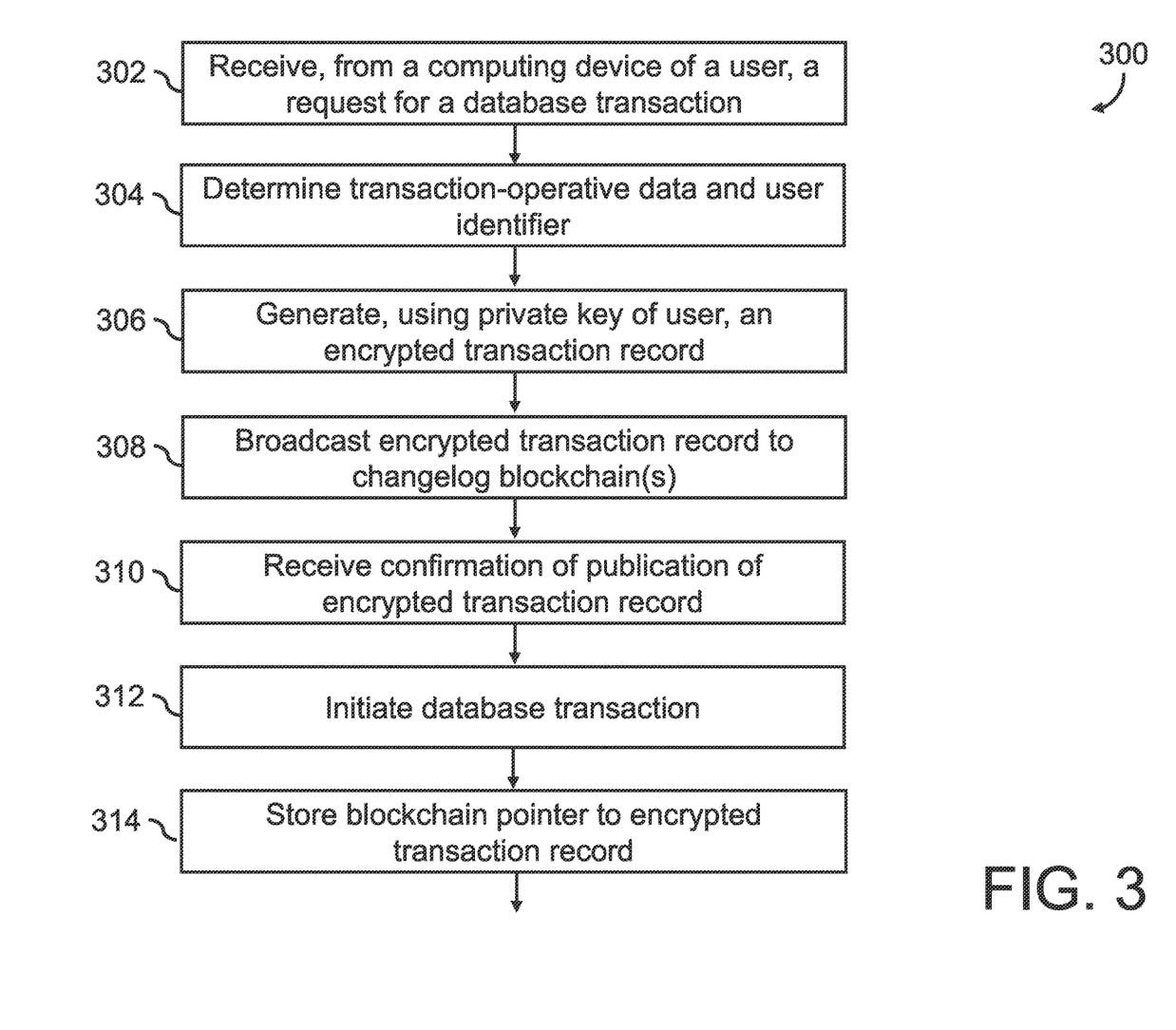
FIG. 3 is a process diagram illustrating a non-limiting embodiment of a method for detecting malicious changelog modifications with blockchain, according to the principles of the present disclosure.

With specific reference to FIG. 3, and in some non-limiting embodiments or aspects, illustrated is a method 300 for detecting malicious changelog modifications using blockchain. One or more steps of method 300 may be carried out by one or more processors of a database management system 104, verification system 114, blockchain network 110, another computing device, or any combination thereof. In step 302, a database management system may receive, from a computing device of a user, at least one request for at least one database transaction. In step 304, the database management system may determine transaction-operative data associated with the at least one database transaction and/or a user identifier associated with the user. In step 306, the database management system may generate, using a private key of the user, an encrypted transaction record including an encryption of the transaction-operative data and/or the user identifier. An encrypted transaction record may correspond to one or more database transactions requested by a user. In step 308, the database management system may broadcast the encrypted transaction record to at least one changelog blockchain.

In step 310, the database management system may receive at least one confirmation of publication of the encrypted transaction record to the at least one changelog blockchain. In step 312, in response to receiving the at least one confirmation of the encrypted transaction record being published as a changelog record to the at least one changelog blockchain, the database management system may initiate the at least one database transaction. In step 314, the database management system may store, in at least one database, a blockchain pointer to the encrypted transaction record in association with transaction data of the at least one database transaction.

Figure 4:
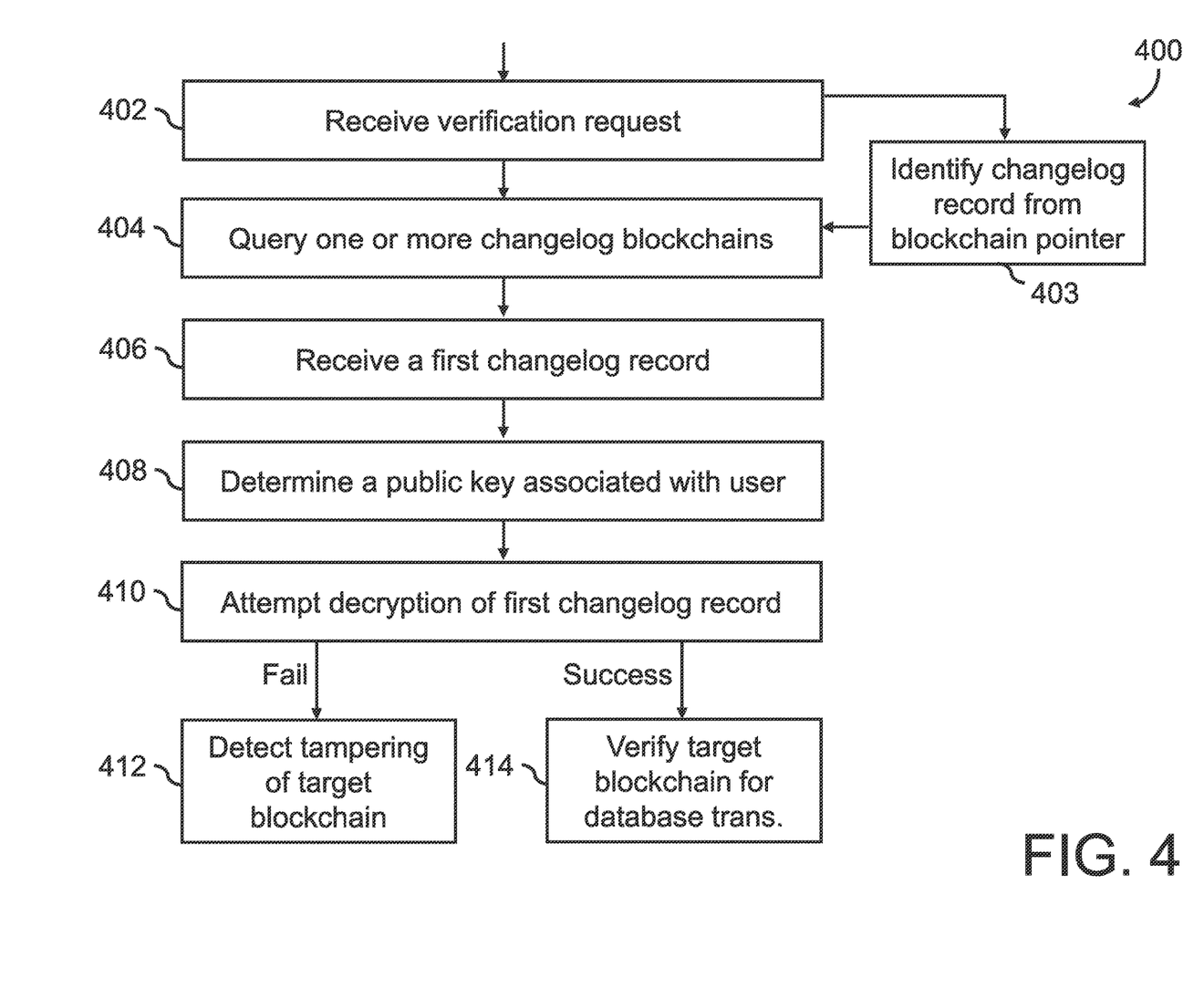
FIG. 4 is a process diagram illustrating a non-limiting embodiment of a method for detecting malicious changelog modifications with blockchain, according to the principles of the present disclosure.

With specific reference to FIG. 4, and in some non-limiting embodiments or aspects, illustrated is a method 400 for detecting malicious changelog modifications using blockchain. The method 400 of FIG. 4 may be executed subsequent to the method 300 of FIG. 3. One or more steps of method 400 may be carried out by one or more processors of a database management system 104, verification system 114, blockchain network 110, another computing device, or any combination thereof. In step 402, the database management system may receive a verification request, which may cause the database management system to review one or more changelog records of one or more changelog blockchains for tampering. The verification request may identify a database transaction and/or a target blockchain. Alternatively, in step 402, the verification request may neither identify a database transaction nor a target blockchain and may instead trigger the database management system to complete a general review of one or more changelog records of one or more changelog blockchains.

In step 403, if a database is configured to store blockchain pointers to encrypted transaction records in association with transaction data of database transactions, the database management system may identify a first changelog record from the verification request based on the blockchain pointer in correspondence with at least one database transaction for review. In step 404, the database management system may query one or more changelog blockchains for changelog records for review. In step 406, the database management system may receive a first changelog record associated with the at least one database transaction from the target blockchain. In step 408, the database management system may determine, from a public key infrastructure (PKI), a public key associated with the user. In step 410, the database management system may attempt to decrypt the first changelog record using the public key. In response to failed decryption of the first changelog record using the public key, the database management system may, in step 412, detect tampering of the target blockchain for the at least one database transaction. In response to successful decryption of the first changelog record using the public key, the database management system may, in step 414, verify the target blockchain for the at least one database transaction.

Figure 5:
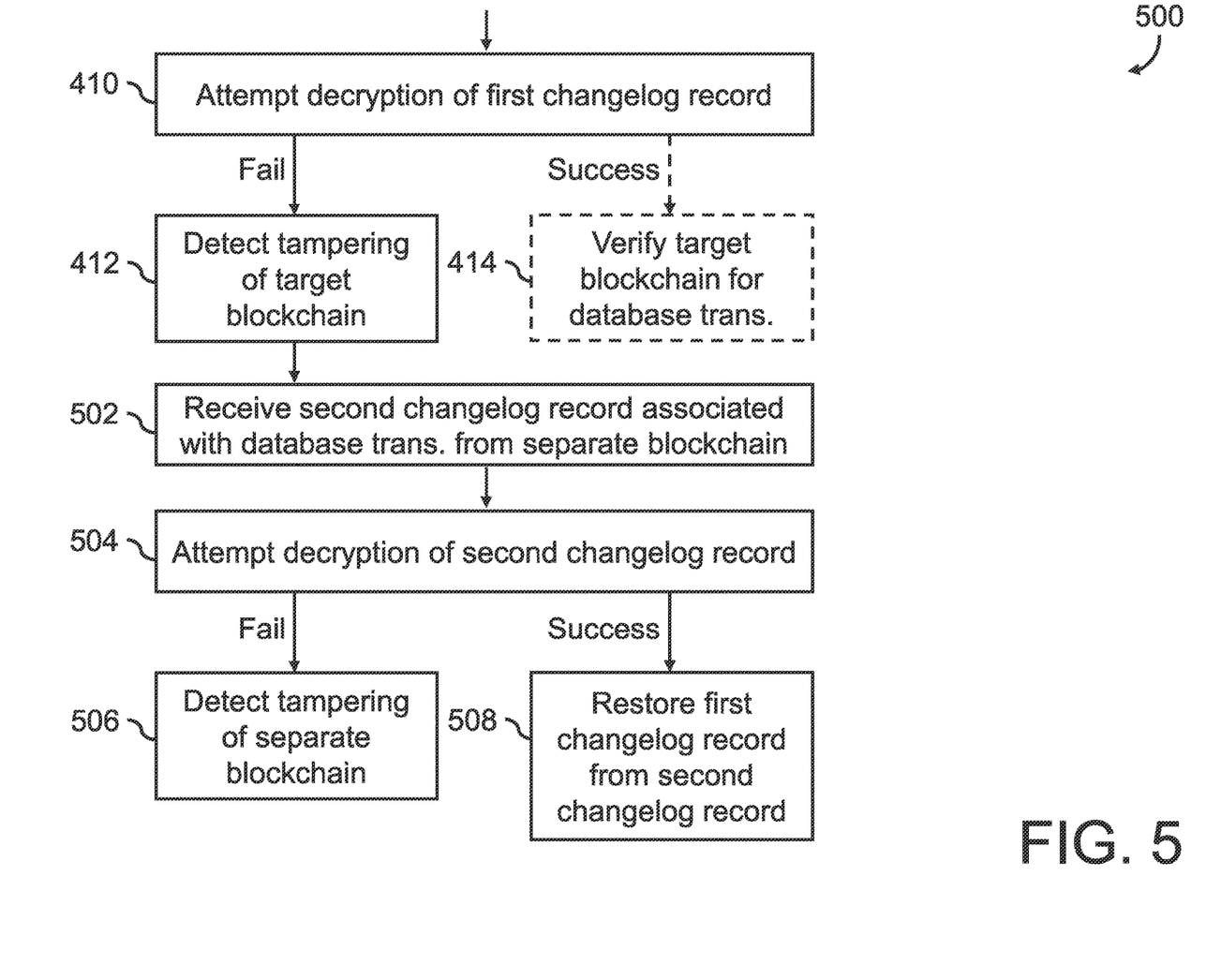
FIG. 5 is a process diagram illustrating a non-limiting embodiment of a method for detecting malicious changelog modifications with blockchain, according to the principles of the present disclosure.

With specific reference to FIG. 5, and in some non-limiting embodiments or aspects, illustrated is a method 500 for detecting malicious changelog modifications using blockchain. The method 500 of FIG. 5 may augment method 400 of FIG. 4 and may be executed subsequent to the method 300 of FIG. 3. One or more steps of method 500 may be carried out by one or more processors of a database management system 104, verification system 114, blockchain network 110, another computing device, or any combination thereof. In step 410, the database management system may attempt to decrypt the first changelog record using the public key. In response to failed decryption of the first changelog record using the public key, the database management system may, in step 412, detect tampering of the target blockchain for the at least one database transaction. Further, in response to failed decryption of the first changelog record using the public key, the database management system may, in step 502, receive a second changelog record associated with the at least one database transaction from a separate blockchain of the at least one changelog blockchain. In step 504, the database management system may attempt to decrypt the second changelog record using the public key.

In response to failed decryption of the second changelog record using the public key, the database management system may, in step 506, detect tampering of the separate blockchain for the at least one database transaction. This may indicate systemic malicious changelog manipulation across multiple changelog blockchains. In response to successful decryption of the second changelog record using the public key, the database management system may, in step 508, verify the second changelog record as untampered. The database management system may further restore the first changelog record of the target blockchain using the second changelog record of the separate blockchain.

With further reference to the foregoing figures, and in further non-limiting embodiments or aspects, the above-described systems and methods may be used for a plurality of database transactions. The verification request may be associated with an automatically triggered internal review of a database system including one or more databases 108 and one or more changelog blockchains 112. The verification request may be configured to cause the verification system 114 and/or database management system 104 to receive and attempt to decrypt each changelog record of a target blockchain for each of the plurality of database transactions.

With further reference to the foregoing figures, a database 108 may be reconfigured to accommodate the described changelog infrastructure. In non-limiting embodiments or aspects, a database 108 table may be augmented with two extra columns (e.g., in addition to existing k columns), one for storing a blockchain pointer and another for storing a user identifier. The blockchain pointer may correspond a database entry (e.g., record) to an encrypted transaction record stored in a changelog blockchain 112, e.g., by holding a unique identifier (e.g., transaction ID, encrypted transaction record ID, etc.). The user identifier may be a unique identifier of a user 102 who issued the insert/update query for the data stored in a given record.

With further reference to the foregoing figures, a user 102 may initiate an insert/update query to a database 108. The database management system 104 may try to extract all fields from the insert/update query, digitally sign all the tuples with the user's private key, hash the generated tuple, and broadcast the hash of the tuple as a transaction record to the blockchain network 110. The database management system 104 may wait for the transaction record to be mined in a block in the blockchain 112 and get a predetermined number of confirmations 107 (e.g., as compared to a threshold). When a transaction has received the required number of confirmations 107, the database management system 104 will store the transaction ID and identifier of the user 102 to the database 108, thereafter executing the insert/update query into the database 108.

With further reference to the foregoing figures, the database management system 104 may perform a series of checks after receiving a response from the database 108 for a select query. The database management system 104 may take the value of the first k columns of a database record and generate a tuple. The database management system 104 may query the blockchain 112 for the transaction using the pointer present in the transaction field (e.g., the k+1 column). Since the transaction is digitally signed by the user private key, the database management system 104 may check the digital signature using the public key retrieved from a PKI based on the user identifier stored in the database record (e.g., the k+2 column). If the signature matches, the database management system 104 may verify the transaction value. If the signature does not match, then the database management system 104 may conclude the database entry was modified in an unauthorized way.

Although the disclosure has been described in detail for the purpose of illustration based on what is currently considered to be the most practical and non-limiting embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
identifying, with at least one processor, at least one database transaction that was initiated in response to a request by a user;
receiving, with at least one processor, a first changelog record associated with the at least one database transaction from a target blockchain of at least one changelog blockchain;
determining, with at least one processor, a public key associated with the user;
attempting, with at least one processor, a decryption of the first changelog record using the public key;
detecting, with at least one processor, tampering of the target blockchain for the at least one database transaction based on determining that the decryption of the first changelog record has failed; and
restoring, with at least one processor, at least part of the target blockchain with at least part of a verified changelog blockchain based on the tampering of the target blockchain.

2. The computer-implemented method of claim 1, further comprising storing, in at least one database, a blockchain pointer to the first changelog record in association with transaction data of the at least one database transaction.

3. The computer-implemented method of claim 2, further comprising:
receiving a verification request identifying the at least one database transaction and the target blockchain of the at least one changelog blockchain; and
identifying the first changelog record from the verification request based on the blockchain pointer stored in association with the transaction data of the at least one database transaction.

4. The computer-implemented method of claim 1, further comprising, in response to failed decryption of the first changelog record using the public key:
receiving a second changelog record associated with the at least one database transaction from a separate blockchain of the at least one changelog blockchain; and
attempting a decryption of the second changelog record using the public key.

5. The computer-implemented method of claim 4, further comprising detecting tampering of the separate blockchain for the at least one database transaction based on determining that the decryption of the second changelog record has failed.

6. The computer-implemented method of claim 4, further comprising restoring the first changelog record of the target blockchain using the second changelog record of the separate blockchain based on determining that the decryption of the second changelog record has succeeded.

7. The computer-implemented method of claim 3, wherein the at least one database transaction comprises a plurality of database transactions, and wherein the verification request is associated with an automatically triggered internal review of a database system, the verification request being further configured to cause at least one processor to attempt to decrypt each changelog record of the target blockchain associated with each of the at least one database transaction.

8. A system comprising a server comprising at least one hardware processor, the server being programmed and/or configured to:
identify at least one database transaction that was initiated in response to a request by a user;
receive a first changelog record associated with the at least one database transaction from a target blockchain of at least one changelog blockchain;
determine a public key associated with the user;
attempt a decryption of the first changelog record using the public key;

detect tampering of the target blockchain for the at least one database transaction based on determining that the decryption of the first changelog record has failed; and
restore at least part of the target blockchain with at least part of a verified changelog blockchain based on the tampering of the target blockchain.

9. The system of claim 8, wherein the server is further programmed and/or configured to store, in at least one database, a blockchain pointer to the first changelog record in association with transaction data of the at least one database transaction.

10. The system of claim 9, wherein the server is further programmed and/or configured to:
receive a verification request identifying the at least one database transaction and the target blockchain of the at least one changelog blockchain; and
identify the first changelog record from the verification request based on the blockchain pointer stored in association with the transaction data of the at least one database transaction.

11. The system of claim 8, wherein the server is further programmed and/or configured to, in response to failed decryption of the first changelog record using the public key:
receive a second changelog record associated with the at least one database transaction from a separate blockchain of the at least one changelog blockchain; and
attempt a decryption of the second changelog record using the public key.

12. The system of claim 11, wherein the server is further programmed and/or configured to detect tampering of the separate blockchain for the at least one database transaction based on determining that the decryption of the second changelog record has failed.

13. The system of claim 11, wherein the server is further programmed and/or configured to restore the first changelog record of the target blockchain using the second changelog record of the separate blockchain based on determining that the decryption of the second changelog record has succeeded.

14. The system of claim 10, wherein the at least one database transaction comprises a plurality of database transactions, and wherein the verification request is associated with an automatically triggered internal review of a database system, the verification request being further configured to cause the server to attempt to decrypt each changelog record of the target blockchain associated with each of the at least one database transaction.

15. A computer program product comprising at least one non-transitory computer-readable medium including program instructions that, when executed by at least one processor, cause the at least one processor to:
identify at least one database transaction that was initiated in response to a request by a user;
receive a first changelog record associated with the at least one database transaction from a target blockchain of at least one changelog blockchain;
determine a public key associated with the user;
attempt a decryption of the first changelog record using the public key;
detect tampering of the target blockchain for the at least one database transaction based on determining that the decryption of the first changelog record has failed; and
restore at least part of the target blockchain with at least part of a verified changelog blockchain based on the tampering of the target blockchain.

16. The computer program product of claim 15, wherein the program instructions further cause the at least one processor to store, in at least one database, a blockchain pointer to the first changelog record in association with transaction data of the at least one database transaction.

17. The computer program product of claim 16, wherein the program instructions further cause the at least one processor to:
receive a verification request identifying the at least one database transaction and the target blockchain of the at least one changelog blockchain; and
identify the first changelog record from the verification request based on the blockchain pointer stored in association with the transaction data of the at least one database transaction.

18. The computer program product of claim 15, wherein the program instructions further cause the at least one processor to, in response to failed decryption of the first changelog record using the public key:
receive a second changelog record associated with the at least one database transaction from a separate blockchain of the at least one changelog blockchain; and
attempt a decryption of the second changelog record using the public key.

19. The computer program product of claim 18, wherein the program instructions further cause the at least one processor to:
detect tampering of the separate blockchain for the at least one database transaction based on determining that the decryption of the second changelog record has failed; or
restore the first changelog record of the target blockchain using the second changelog record of the separate blockchain based on determining that the decryption of the second changelog record has succeeded.

20. The computer program product of claim 17, wherein the at least one database transaction comprises a plurality of database transactions, and wherein the verification request is associated with an automatically triggered internal review of a database system, the verification request being further configured to cause the at least one processor to attempt to decrypt each changelog record of the target blockchain associated with each of the at least one database transaction.

* * * * *